Feb. 26, 1957   J. B. G. GRICE   2,783,001
FISHING REEL
Filed June 9, 1954   2 Sheets-Sheet 1
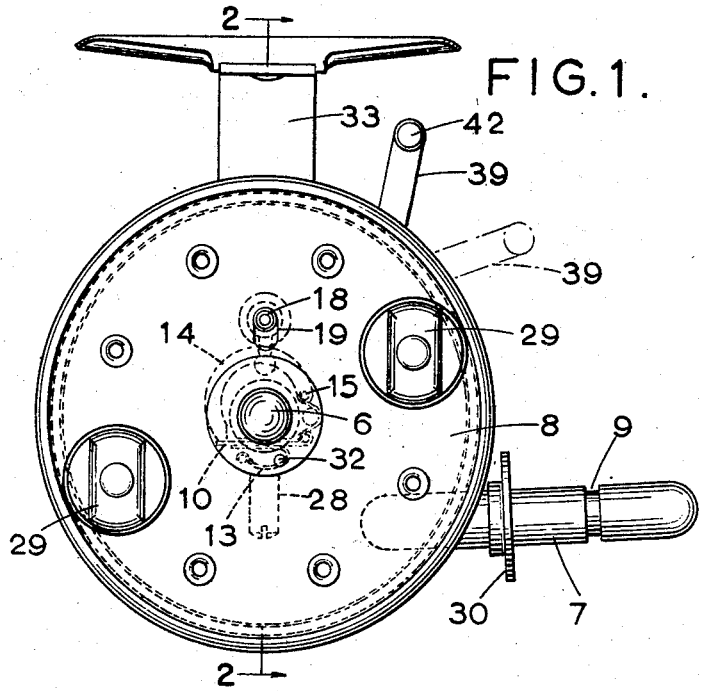
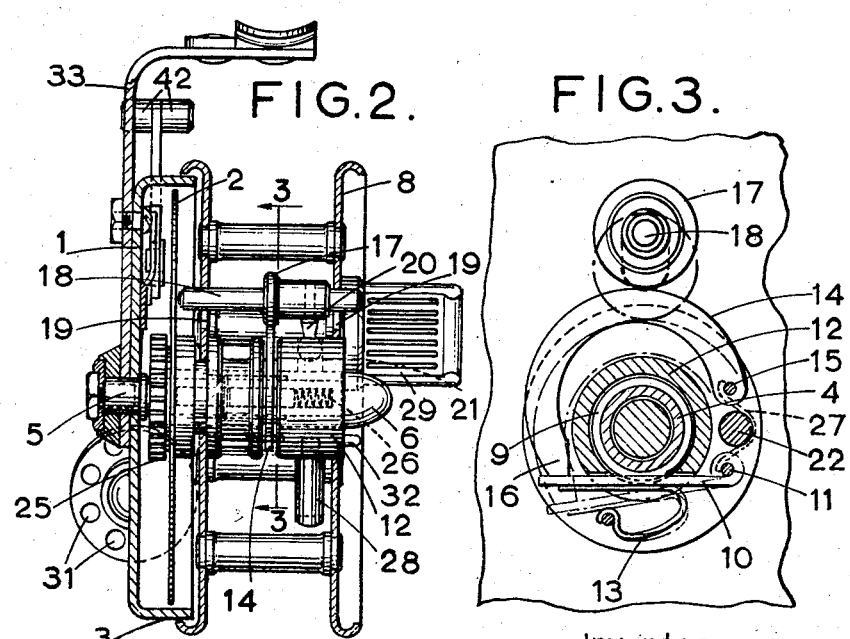
Inventor
JOSEPH B. G. GRICE
By Toulmin & Toulmin
Attorneys Feb. 26, 1957  J. B. G. GRICE  2,783,001
FISHING REEL
Filed June 9, 1954  2 Sheets-Sheet 2
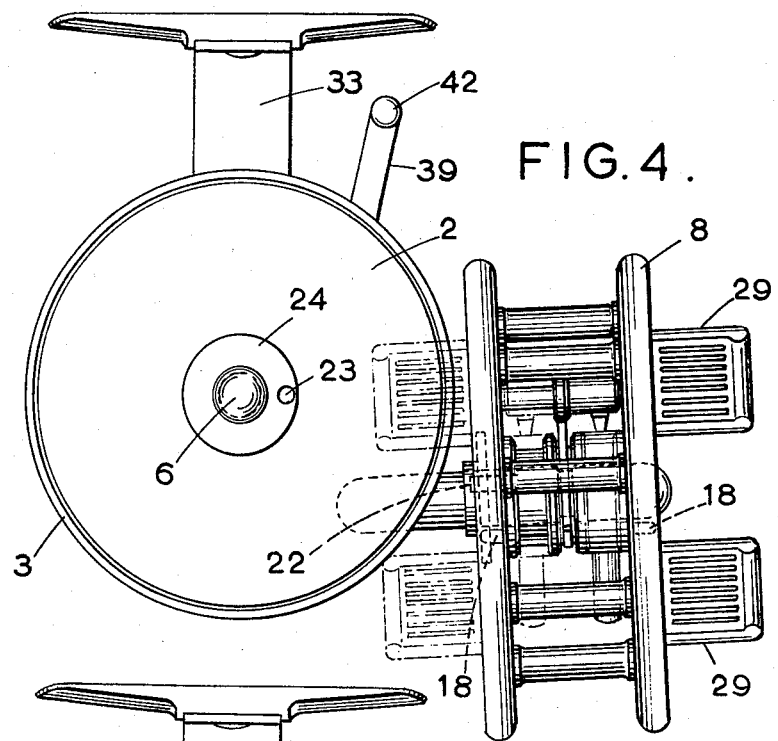
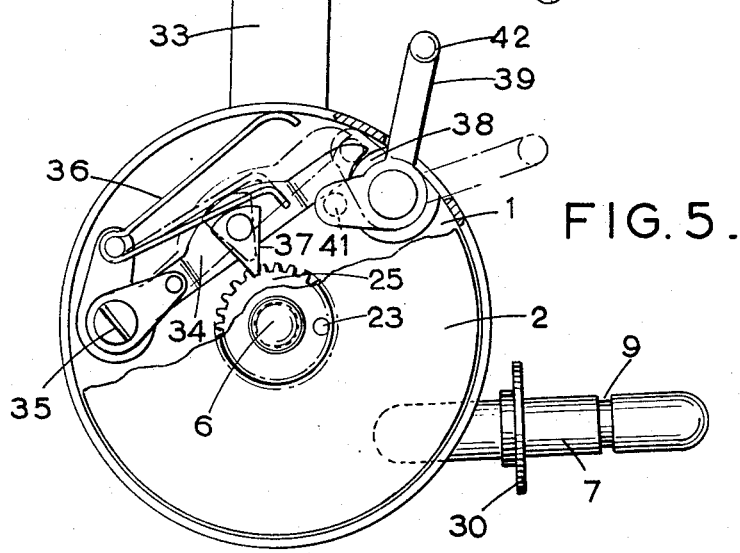
Inventor
JOSEPH B.G. GRICE
By Toulmin & Toulmin
Attorneys

United States Patent Office 2,783,001
Patented Feb. 26, 1957

2,783,001

FISHING REEL

Joseph Brindley Gurney Grice, Christchurch, England

Application June 9, 1954, Serial No. 435,508

Claims priority, application Great Britain
January 22, 1954

9 Claims. (Cl. 242—84.6)

The chief object of the invention is to evolve a fishing reel which will combine the advantages of a Nottingham type reel with one of the fixed spool type.

A fishing reel in accordance with the present invention comprises an annular body or cover of shallow dish-shape, an axially mounted spool carrying spindle carried by said body or a part associated therewith, a second spool carrying spindle carried by said body and arranged at right angles to the first spindle and of similar dimensions, a spool adapted to be mounted on the first spindle in the usual manner or alternatively mounted on the second spindle in a position in which the spool driving handles project either forwardly or rearwardly and means for locating said spool on either spindle in any of its three alternative positions and in a quickly detachable manner.

It will be appreciated that the spool will normally be mounted on the first spindle, but can quickly be removed and placed on the second or dummy spindle with the handles projecting forwardly so that the spool lies at right angles to the rod, the handles facing the tip of the rod. In this position the line peels off without the spool turning and obviates normal inertia of a rotating spool.

It will be appreciated that after the cast has been made a twist will have been put in the line, this disadvantage being inherent in all fixed spool reels as at present manufactured, but with the reel in accordance with the present invention this twist may be removed after retrieving by placing the spool on the dummy spindle with the handles facing rearwardly, i. e., the position of the spool on the dummy spindle is reversed.

Referring to the drawings:

Figure 1 is a side elevation of a fishing reel in accordance with the invention;

Figure 2 is a vertical section on the line 2—2 in Figure 1;

Figure 3 is a section drawn to an enlarged scale on the line 3—3 in Figure 2;

Figure 4 is a side elevation showing the spool in its alternative fixed spool position;

Figure 5 is a fragmentary side elevation of the reel showing the clicker mechanism, the spool being detached.

In a preferred embodiment of the invention as applied to a reel in which the body or cover 1 contains suitable check mechanism, for example, clicker mechanism or frictional braking mechanism or both, it is preferred that such mechanism shall be arranged beneath an annular cover plate 2 which fits closely within the walls 3 of the body and protects the mechanism against ingress of dirt or dust.

In such a case it is preferred to form the first spindle as a bush 4 which is mounted centrally on the cover plate 2 the bush and cover plate revolving about a fixed spindle 5 which is mounted centrally on the body, means such as the securing screw 6 being provided for securing the bush and cover plate on the centrally arranged fixed spindle but in a detachable manner so that access can be obtained to the check mechanism when required.

The second spindle 7 which is attached to the body and lies in a vertical plane lying at substantially 90° to the vertical plane containing the first spindle will have the same dimensions as the bush 4 and to enable the position of the spool 8 on the second spindle to be reversed, it is proposed to form the second spindle 7 and also the bush 4 with a centrally positioned annular groove 9 with which a spring urged catch, mounted on the spool, can engage irrespective of the position of the spool, the catch being releasable by a finger actuated knob.

To enable the spool to be quickly placed in position on either spindle, spindle 7 is formed with a part conical or domed extremity whilst the securing screw 6 is similarly formed which provides a lead and serves to hold back the catch until it registers with the groove. The catch projects inwardly into the interior of the spool bush, the latter being removable from the bush when required, for example, when replacing a broken spring.

The preferred form of catch mechanism is more clearly shown in Figures 2 and 3 the catch being releasable from either side of the spool. The catch mechanism comprises a catch proper 10 pivotally mounted at 11 between two flange-like parts of the spool bush 12, the latter being slotted to permit entry of the catch through the wall of the bush and into the annular groove 9 in either the bush or the second spindle. The catch is urged into engagement with the groove 9 by an associated spring 13. To disengage the catch from the groove, a catch segment 14 is pivotally mounted at 15 between the flanges on the spool bush, the free end 16 of the segment bearing downwardly on the catch near its free end. The segment is urged upwardly under the action of the spring 13 into engagement with an annular projection 17 on a catch lever 18 the latter projecting through radially arranged slots 19 formed in the front and back plates of the spool.

The catch lever will be maintained normally in a horizontal position by the upward pressure exerted by the spring 13 in which position it engages the upper extremities of the grooves. If one of the projecting ends of the lever is depressed, the opposite groove extremity forms a fulcrum about which the lever pivots and consequently the segment 14 will be forced downwardly to disengage the catch from the groove. The catch lever is centralised by a ball end projection 20 which enters a radial boring 21 in the spool bush, the ball joint thus provided permitting the required rocking movement in either direction.

The spool is drivably connected with the bush 4 and its connected cover plate 2 by a plunger 22 which engages a hole 23 formed in a flange 24 to which the cover plate 2, bush 4 and clicker wheel 25 are secured. The plunger 22 is urged into engagement with the hole 23 by a coiled spring 26 and is loaded by means of a spring clip 27 which engages a recess in the periphery of the plunger. Diametrically opposite the catch lever 18 is a balance screw 28 having a mass sufficient to balance the weight of the catch lever and ensure a balanced rotational movement of the spool.

The front plate of the spool carries the usual handles 29 and as is clearly shown in Figure 4 when the reel is to be used as a reel of the fixed spool type, the spool is mounted on the second spindle 7 the handles projecting either forwardly as shown or rearwardly as indicated by dotted lines. To prevent rotation of the spool when mounted on the second spindle the latter carries a fixed flange 30 which is formed with a series of holes 31 (see Figure 2) any one of which holes is enterable by the plunger 22 or by a similarly positioned pin 32 (see Figures 1 and 2) when the position of the spool is reversed.

The body is carried by the usual inverted L shaped bracket 33 for attachment to the rod.

Figure 5 shows the clicker mechanism which comprises a lever 34 pivotally mounted on the body at 35 and carrying a hair pin type spring 36, the latter bearing on the inner face of the body wall and on the clicker tooth 37. Penetration of the clicker tooth between the teeth of the clicker wheel is limited by a fixed stop 38 which is engaged by the extremity of the lever 34. The clicker lever 39 which projects through a slot in the body wall is pivotally mounted at 40 and carries at its opposite end a roller 41 which bears on the edge of the lever 34 to move the clicker out of operation when the lever 39 is moved into the dotted line position in which position the lever 39 has moved through a dead centre position. The lever 39 is fitted with a double knob 42 by which the line can be trapped preparatory to casting.

I claim:

1. A fishing reel comprising an annular body of shallow dish-shape, a first spool-carrying spindle centrally and axially mounted in said annular body, a second spool-carrying spindle mounted on said body and arranged at right angles to said first spindle, said second spindle being of substantially equal diameter as said first spindle, a spool, a spool driving handle projecting from said spool, said spool having a central opening of somewhat larger diameter than said first and second spindle so as to fit snugly on either spindle, thereby permitting said spool to be mounted rotatively on said first spindle in the usual manner, or being alternatively mounted on said second spindle and secured against rotation in position in which the spool driving handle projects either forwardly or rearwardly, and means for locating said spool on either of said spindles.

2. A fishing reel as described in claim 1, wherein holding means are provided for positively holding said spool against rotational movement when mounted on said second spindle.

3. A fishing reel as described in claim 2, wherein said holding means comprise a flange fixedly mounted on said second spindle and provided with at least one hole for engagement by a projection on each side of said spool.

4. A fishing reel as described in claim 1, wherein said spool has a front and a rear plate; and wherein a spring-urged catch is provided mounted between said front and rear plates; said first and second spindle each being provided with a circumferential groove, said spring-urged catch being adapted to releasably engage said groove.

5. A fishing reel as described in claim 4, wherein a rocking finger-actuated catch release lever is provided between said front and rear spool plates, the ends of said lever projecting from said plates, said spring-urged catch being operated in a releasing sense by said finger-actuated lever.

6. A fishing reel as described in claim 5, wherein said first spindle is a bush having a radial bore, a ball-headed projection being mounted between said spool plates and being seated in said bore, said catch release lever being rockably mounted on said ball-headed projection.

7. A fishing reel as described in claim 6, comprising a segment-shaped catch release pivotally mounted on said spool bush and bearing on said catch to move the latter out of its associated groove on depression of either end of said catch release lever, the ends of said catch release lever projecting through radial slots in said front and rear spool plates.

8. A fishing reel as described in claim 1, wherein a cover plate is provided centrally with said dish-shaped body and fitting closely within the peripheral wall of the latter, a check mechanism housed in said dish-shaped body beneath said cover plate, said first spindle being in the form of a bush fixedly associated with said cover plate and readily removable together therewith so as to obtain access to said check mechanism.

9. A fishing reel as claimed in claim 8, wherein said check mechanism is controlled by a lever which projects upwardly from the body and is fitted at its extremity with a double knob by means of which the line can be trapped preparatory to casting.

References Cited in the file of this patent

UNITED STATES PATENTS 2,534,340  Chaya et al.  Dec. 13, 1950